(12) United States Patent
Requena et al.

(10) Patent No.: US 12,284,945 B2
(45) Date of Patent: Apr. 29, 2025

(54) ROBOTIC HANDLING OF PICKED FRUIT OR VEGETABLES

(71) Applicant: Fieldwork Robotics Limited, Plymouth (GB)

(72) Inventors: Ignacio Martin Requena, Cambridge (GB); Maximilian Knolseisen, Cambridge (GB); Martin Stoelen, Plymouth (GB)

(73) Assignee: Fieldwork Robotics Limited, Plymouth (GB)

( * ) Notice: Subject to any disclaimer, the term of this patent is extended or adjusted under 35 U.S.C. 154(b) by 790 days.

(21) Appl. No.: 17/601,330

(22) PCT Filed: Apr. 3, 2020

(86) PCT No.: PCT/GB2020/050890
§ 371 (c)(1),
(2) Date: Oct. 4, 2021

(87) PCT Pub. No.: WO2020/201766
PCT Pub. Date: Oct. 8, 2020

(65) Prior Publication Data
US 2022/0174877 A1    Jun. 9, 2022

(30) Foreign Application Priority Data
Apr. 4, 2019 (GB) .................................... 1904774

(51) Int. Cl.
*A01D 46/30* (2006.01)
(52) U.S. Cl.
CPC .................... *A01D 46/30* (2013.01)

(58) Field of Classification Search
CPC ...... A01D 46/30; A01D 46/24; A01D 46/243; B25J 9/162; B25J 9/1697; B25J 9/042;
(Continued)

(56) References Cited

U.S. PATENT DOCUMENTS 10,779,472 B2 *  9/2020  Robertson ............ B25J 15/0019
2018/0092304 A1 *  4/2018  Moore ................... B25J 9/0084
2020/0323140 A1 * 10/2020  Gielis .................... A01D 46/24

FOREIGN PATENT DOCUMENTS

CN       107318379 A       11/2017
CN       107455091 A       12/2017
(Continued)

OTHER PUBLICATIONS

The Intellectual Property Office of the United Kingdom—Search Report under Sections 17(5), pertaining to GB Application No. 1904774.5, dated Sep. 18, 2019, 4 pages.
(Continued)

*Primary Examiner* — Thomas B Will
*Assistant Examiner* — Robert E Pezzuto
(74) *Attorney, Agent, or Firm* — Barclay Damon LLP

(57) ABSTRACT

In general terms, the present invention provides a storage system for a fruit or vegetable picking system, in which picked fruit or vegetables are delivered to a fixed filling location of the storage system, and then moved, by a robotic handling mechanism of the storage system, to one of many container locations where filled containers (punnets) are temporarily stored.

17 Claims, 11 Drawing Sheets

(58) Field of Classification Search
CPC ........ B25J 9/0009; B25J 9/0084; B25J 9/026;
B25J 17/00; B25J 17/02
See application file for complete search history.

(56) References Cited

FOREIGN PATENT DOCUMENTS

| | | |
|---|---|---|
| CN | 108243726 A | 7/2018 |
| CN | 109429723 A | 3/2019 |
| DE | 102006004511 B3 | 8/2007 |
| DE | 102015111682 A1 | 2/2017 |
| WO | 2018/087546 A1 | 5/2018 |
| WO | 2018/167784 A1 | 9/2018 |
| WO | 2019/053474 A2 | 3/2019 |

OTHER PUBLICATIONS

International Searching Authority—International Search Report, pertaining to International Application No. PCT/GB2020/050890, dated Jun. 23, 2020, together with the Written Opinion of the International Searching Authority, 13 pages.
EP Communication for European Patent Application No. 20718752.7 dated Mar. 3, 2025 (4 pages).

* cited by examiner

ROBOTIC HANDLING OF PICKED FRUIT OR VEGETABLES

CROSS-REFERENCE TO RELATED APPLICATIONS

This application is the national phase entry of International Patent Application No. PCT/GB2020/050890 filed on Apr. 3, 2020, and claims the benefit of Great Britain Patent Application No. 1904774.5 filed Apr. 4, 2019, the disclosures of which are incorporated herein by reference in their entirety.

TECHNICAL FIELD

This invention relates to systems and methods for handling picked fruit or vegetables via robotic means, and in particular to the filling of containers (e.g. punnets) with such fruit or vegetables.

BACKGROUND

In recent years the use of robotic arms to pick fruit or vegetables has been widely explored. An example of such a robotic arm is described in WO2019/053474.

A key factor in the commercial success of picking systems employing such robotic arms is the cycle time associated with picking each item of fruit or vegetable. The present invention aims to reduce such cycle times.

SUMMARY OF THE INVENTION

In general terms, the present invention provides a storage system for a fruit or vegetable picking system, in which picked fruit or vegetables are delivered to a fixed filling location of the storage system, and then moved, by a robotic handling mechanism of the storage system, to one of many container locations where filled containers (punnets) are temporarily stored.

The present inventors have identified that the cycle time of each 'pick' can be minimised by limiting the work carried out by the picking arm. Thus, in the present invention the picking arm delivers picked items directly to a fixed filling location, and the storage system performs the work of moving the picked items to container locations where the filled containers (punnets) are temporarily stored. This shortens picking cycle times and also minimises the overall size and torque requirements of the picking arm since the distance from the base of the arm that is travelled by the picking end-effector is minimised. In addition, this arrangement minimises touching, or direct handling, of the picked items.

In some picking systems the picking arm delivers picked fruit or vegetables directly to any of a plurality of punnets to be filled, and the filled punnets are then removed and replaced with empty ones. However, the inventors have recognised that a disadvantage of such an arrangement is that a proportion of each cycle time is taken up by delivery of the picked fruit or vegetable to the punnet.

A first aspect of the present invention provides a fruit or vegetable picking system comprising: a moveable base; one or more robotic picking arms mounted on the base, the one or more picking arms each having a picking end-effector configured to pick a fruit or vegetable; and a storage system mounted on the base, the storage system having: a filling location configured to receive picked fruit or vegetables; a storage region having a plurality of container locations, each container location being configured to house a fruit or vegetable container; and a robotic handling mechanism configured to move fruit or vegetables from the filling location to any of the plurality of container locations, wherein the one or more robotic picking arms are controllable to deliver picked fruit or vegetables to the filling location.

The robotic picking arms may be mounted directly on the base, but more likely are mounted indirectly via a superstructure of the picking system or similar. Similarly, the storage system may be mounted directly on the base, but may alternatively be mounted indirectly.

The robotic picking arm may comprise any suitable robotic arm having an end-effector configured to pick fruit or vegetables. An example of a suitable picking arm is disclosed in WO2019/053474.

The filling location may comprise any location having a fixed position relative to the picking system, and thus a fixed position relative to the one or more picking arms. The filling location may have no structural features. However, the storage system is configured to permit passage of at least a portion of the robotic handling mechanism between the filling location and each of the container locations. For example, an end-effector of the robotic handling mechanism may be configured to project into the filling location.

Each container location may comprise an area or volume sufficient to contain a fruit or vegetable container such as a punnet. In some embodiments the shape, size and/or number of container locations within the storage region may be modified in use. In other words, the storage region may be configured to comprise a variable number of container locations. That is, the configuration of the plurality of container locations within the storage region may be dependent on the fruit or vegetable the fruit or vegetable picking system is configured to pick. For example, in a fruit or vegetable picking system configured for picking soft fruit (typically housed in containers having a relatively small footprint) the number of container locations within the storage region thereof may be greater than in a fruit or vegetable picking system configured for picking vegetables (typically housed in containers having a relatively large footprint). The robotic handling mechanism may comprise a controller or control module configured to control movement of an end-effector to thereby move fruit or vegetables from the filling location to any of the plurality of container locations The system may comprise: a plurality of robotic picking arms mounted on the base, each picking arm having a picking end-effector configured to pick a fruit or vegetable; and a plurality of storage systems mounted on the base, each storage system having: a filling location; a storage region having a plurality of container locations, each container location being configured to house a fruit or vegetable container; and a robotic handling mechanism configured to move fruit or vegetables from the filling location to any of the plurality of container locations, wherein each robotic picking arm is controllable to deliver picked fruit or vegetables to the filling location of a respective one of the plurality of storage systems.

Thus, multiple picking operations can be carried out at one time, via operation of one picking system.

In preferred embodiments the plurality of storage systems are stacked one on top of each other on the movable base. Thus, each storage system can serve a different vertical picking region. Moreover, the number of storage systems may be chosen based on the overall height of the vines, trees or bushes to be picked. This arrangement is particularly advantageous since it provides modularity, and enables a single picking system to be adapted for different crops. Thus, the, or each, storage system preferably comprises a self-contained unit containing the filling location, storage region and robotic handling mechanism.

The picking system may comprise one or more mass sensors configured to measure a mass of picked fruit or vegetables. This arrangement enables a mass of the picked fruit or vegetables to be determined before each filled fruit or vegetable container is removed from the storage region of the storage system. In this way, quality control checks can be carried out during the picking process, in order to reduce overall processing time. For example, the mass sensor may be included in the, or each, storage system. More generally, the mass sensor may be a feature of, or associated with: the or each robotic picking arm; the filling location of the, or each, storage system; the handling end-effector of the, or each, robotic handling mechanism; and/or each container location of the, or each, storage system.

Preferably, the, or each, robotic picking arm is mounted adjacent the filling location of the, or the respective, storage system. This arrangement further shortens picking cycle times and further minimises the overall size and torque requirements of the picking arm by limiting the distance from the base of the arm that is travelled by the picking end-effector.

The storage region of the, or each, storage system is preferably enclosed within an interior volume of a superstructure of the storage system, and the filling location of the, or each, storage system is preferably outside of the interior volume. In this way, the robotic handling mechanism, other features of the storage system, and picked fruit within the storage system can be enclosed, yet the filling location be easily accessed by the picking arm. Thus, the, or each, robotic handling mechanism is preferably located within the interior volume.

Preferably at least a portion of a handling end-effector of the, or each, robotic handling mechanism can extend outside of the interior volume, in use, to collect fruit or vegetables from the filling location.

The plurality of container locations in the storage region of the, or each, robotic handling mechanism are preferably arranged in a generally horizontal array. This enables containers (punnets) to be arranged in single layers in crates (trays), which is the preferred delivery format of many purchasers of fruit or vegetables. Thus, the storage region may comprise one or more trays (crates) defining the plurality of container locations, the one or more trays (crates) being removable from the storage system to thereby remove filled fruit or vegetable containers.

The, or each, robotic handling mechanism preferably comprises a handling end-effector configured to move linearly along any of the three axes of a Cartesian coordinate system. This arrangement enables straightforward movement of picked fruit or vegetables to a desired container location.

The, or each, robotic handling mechanism may comprise a movable carriage, the handling end-effector being mounted on the movable carriage. The movable carriage may be mounted on an overhead gantry. The handling end-effector may be movable linearly (e.g. generally vertically) relative to the movable carriage, for example via a worm drive or other type of linear sliding joint.

In some embodiments a handling end-effector of the, or each, robotic handling mechanism comprises an open-topped vessel for receiving picked fruit or vegetables from the, or the respective, picking arm. In this way, the vessel can be positioned at the filling location while picked fruit or vegetables are placed into it, and then subsequently moved to a given container location when the vessel is filled. The vessel may comprise an opening in a base thereof and a door movable between a closed configuration in which the opening is obscured and an open configuration in which fruit or vegetables can pass through the opening. This provides a straightforward means of transferring picked fruit or vegetables from the vessel to a container (punnet) at the container location. The robotic handling mechanism is thus preferably configured to position the door in the open configuration only when the open-topped container is positioned above a respective one of the plurality of container locations.

In some embodiments, such a handling end-effector comprises a mass sensor configured to measure a mass of contents of the open-topped vessel. Alternatively, and/or in addition, in any embodiment the storage system may comprise a mass sensor configured to measure a mass of a container of fruit or vegetables at the filling location. Such arrangements enable a mass of the picked fruit or vegetables to be determined before delivery to the storage region of the storage system. In this way, quality control checks can be carried out during the picking process, in order to reduce overall processing time.

In yet further embodiments, the open-topped vessel of such a handling end-effector is divided into a plurality of compartments, each compartment having a respective opening in the base thereof and a respective door movable between a closed configuration in which the opening is obscured and an open configuration in which fruit or vegetables can pass through the opening. In this way, the, or each, robotic picking arm may be controllable to deliver picked fruit or vegetables of a first grade to a respective one of the plurality of compartments, and to deliver picked fruit or vegetables of a second grade to a respective other one of the plurality of compartments. For example, the first and second grades may comprise different qualities (e.g. level of damage), different levels of maturity (ripeness), different sizes, or any other distinguishing characteristic which may determine how picked items should be differentiated. In this way, fruit or vegetables of different ripeness, sizes or differentiated by other characteristics may be picked and sorted at the same time.

The handling end-effector is preferably controllable to open each door of the plurality of compartments independently. In this way, the contents of each compartment can be delivered to a different container location.

In any embodiment, the storage system may comprise, at each container location, a mass sensor configured to measure a mass of a container of fruit or vegetables at the respective container location.

In an alternative to the open-topped vessel embodiment described above, a handling end-effector of the, or each, robotic handling mechanism comprises a gripper having a gripping configuration in which it is able to grip a container of fruit or vegetables and a release configuration in which it releases a container of fruit or vegetables. In this way, an empty container may be positioned at the filling location and directly filled with picked fruit or vegetables by the picking arm(s). The filled container may then be gripped by the gripper and moved to a given one of the container locations, where the filled container is deposited. The robotic handling mechanism is thus preferably configured to arrange the gripper in the closed configuration to grip a container of fruit or vegetables at the filling location and move the gripper to the open configuration to release a gripped container of fruit or vegetables at a respective one of the plurality of container locations. The gripper preferably comprises one or more actuatable portions (e.g. actuatable finger portions) movable between the closed configuration and the open configuration.

The, or each, storage system may have an alternative filling location, and the, or each, robotic picking arm may be controllable to deliver picked fruit or vegetables of a first grade to the filling location of the, or the respective, storage system and to deliver picked fruit or vegetables of a second grade different to the first quality to the alternative filling location of the, or the respective, storage system. For example, the first and second grades may comprise different qualities (e.g. level of damage), different levels of maturity (ripeness), different sizes, or any other distinguishing characteristic which may determine how picked items should be differentiated. In this way, fruit or vegetables of different ripeness, sizes or differentiated by other characteristics may be picked and sorted at the same time.

Preferably, the robotic handling mechanism of the, or the respective, storage system is configured to move fruit or vegetables from the filling location to any one of a first subset of the plurality of container locations, and to move fruit or vegetables from the alternative filling location to any one of a second subset of the plurality of container locations. This ensures that containers of first grade fruit or vegetables can be stored on different crates (trays) to containers of second grade fruit or vegetables, for example.

Each of the one or more robotic picking arms may comprise a local storage vessel configured to receive a plurality of fruit or vegetables picked by the picking end-effector, and each of the one or more robotic picking arms may be controllable to deliver picked fruit or vegetables from the local storage vessel to the respective filling location. In this way, the cycle time of each picking operation is further reduced.

The local storage vessel may be configured to move in tandem with the picking end-effector of the respective robotic picking arm. Thus, the picked items may be delivered to the filling location by manipulation of the picking arm, in particular by orienting the picking end-effector so that the picked items are transferred from the local storage vessel to the filling location.

The local storage vessel preferably comprises an open-topped vessel arranged beneath the picking end-effector to receive picked items of fruit or vegetables released by the picking end-effector. In this way, picked items can simply drop into the local storage vessel under the action of gravity, without any other transfer step being required.

Each of the one or more robotic picking arms may comprise a mass sensor configured to determine a mass of picked fruit or vegetables contained within the local storage vessel.

The one or more robotic picking arms may be mounted at a mounting face of the picking system that faces forwardly and/or rearwardly in use. That is, there may be no picking arms located on side faces of the picking system, and/or the one or more picking arms may be located on either or both of the faces of the picking system which are generally transverse to those side faces. This arrangement enables the picking system to be used to pick fruit or vegetables to either side thereof. In particular, the picking system may be used to pick from adjacent crop rows by moving in either direction along a movement path between the crop rows, without a need to turn the picking system but instead merely to reverse its direction.

The one or more robotic picking arms may be mounted at a mid-line of the mounting face. That is, the picking arms may be located generally mid-way between side faces of the picking system and/or storage system and/or movable base and/or a pair of wheels of the movable base. For example, the one or more robotic picking arms may be mounted at an intersection between a first plane that is generally transverse to a path of travel of the picking system and a second plane aligned with the path of travel of the picking system that generally bisects the base.

In a related embodiment, the or each filling location may be located on a mounting face of the storage system that faces forwardly and/or rearwardly in use.

The or each robotic picking arms may be able to slide relative to the base, preferably able to slide in a generally horizontal direction relative to the base. In this way, the length of each arm may be minimised.

For example, each arm may be able to slide towards a first side of the base/picking system for picking fruit or vegetables adjacent said first side, and towards a second side of the base/picking system for picking fruit or vegetables adjacent said second side. In preferred embodiments each arm is slideable between first and second positions, and the picking system comprises a locking mechanism for securing the arm in the first position and the second position. Each arm may be mounted on a generally horizontal rail of the picking system, for example, and may be movable between a first end of the rail and a second end of the rail. The rail may be mounted on a respective storage system, for example on the superstructure of a respective storage system.

A second aspect of the invention provides a storage system for handling picked fruit or vegetables, the storage system having: a filling location configured to receive picked fruit or vegetables; a storage region having a plurality of container locations, each container location being configured to house a fruit or vegetable container; and a robotic handling mechanism configured to move fruit or vegetables from the filling location to any of the plurality of container locations.

The storage system may have any of the features of the storage system described above in relation to the first aspect.

A third aspect of the invention provides a method of picking fruit or vegetables using a fruit or vegetable picking system according to the first aspect, the method comprising repeating the steps of:
 (i) picking one or more fruit or vegetables with the, or each, picking arm and delivering the picked fruit or vegetables to the filling location of the, or the respective, storage system; and
 (ii) using the robotic handling mechanism of the, or the respective, storage system to move the picked fruit or vegetables from the filling location to a respective one of the plurality of container locations.

The method may comprise the further step of moving the base, optionally after step (i) and before step (ii). Thus, the picking system may be moved to a new picking position while the storage system is moving the picked fruit or vegetables to the storage region.

The method may comprise picking fruit or vegetables from adjacent first and second crop rows. For example, step (i) may comprise using the one or more robotic picking arms to pick fruit or vegetables from a first crop row by moving the movable base of the picking system in a first direction along a linear movement path between the first crop row and a second crop row, and the method may further include:
 (iii) using the one or more robotic picking arms to pick fruit or vegetables from the second crop row by moving the movable base of the picking system in a second direction, opposite to the first direction, along the linear movement path without turning the fruit or vegetable picking system relative to the linear movement path.

This arrangement enables a single picking system to harvest fruit or vegetables from neighbouring crop rows. Moreover, it is possible to do so without turning the picking system around. Such a method is particularly relevant to embodiments of the picking system in which the one or more picking arms are located on a forwardly and/or rearwardly facing mounting face of the picking system.

In embodiments in which the one or more robotic picking arms are able to slide relative to the base, the method may include, before step (iii), sliding the one or more robotic picking arms relative to the base, from a first position to a second position. Preferably, the first position is offset in a horizontal direction from the second position. Thus, the robotic picking arms can be positioned in the first position during picking from the first crop row and in the second position during picking from the second crop row.

The method may comprise the step of measuring a mass of picked fruit or vegetables delivered to the filling location of the, or the respective, storage system. This step enables quality control steps to be carried out during the picking operation, and thus minimises overall cycle time. The mass may be measured by a mass sensor associated with: the or each robotic picking arm; the filling location of the, or each, storage system; the handling end-effector of the, or each, robotic handling mechanism; and/or each container location of the, or each, storage system.

The method may comprise the step of repairing the fruit or vegetable picking system by removing a faulty storage system and replacing it with a functional storage system. This modularity enables the time the system is off-line due to faults to be minimised. This step is particularly advantageous in combination with arrangements in which the, or each, storage system comprises a self-contained unit containing the filling location, storage region and robotic handling mechanism.

The method may comprise the step of stacking a further storage system on top of the storage system. This step is particularly advantageous in combination with arrangements in which the, or each, storage system comprises a self-contained unit containing the filling location, storage region and robotic handling mechanism.

The method may comprise the step of collecting picked fruit or vegetables from the filling location by extending at least a portion of the handling end-effector of the, or each, robotic handling mechanism outside the interior volume of the respective storage system. This enables picked fruit or vegetables to be easily delivered by the picking arm(s).

The method may comprise the step of removing the one or more trays (crates) from the, or each, storage system to thereby remove filled fruit or vegetable containers. In this way, filled containers can be easily transferred from the picking system for onward travel to the customer.

The method may comprise the step of moving a handling end-effector of the, or each, robotic handling mechanism between the filling location and any of the container locations linearly along any of the three axes of a Cartesian coordinate system. This provides a straightforward means of transferring picked fruit or vegetables to the storage region.

In embodiments comprising an end-effector with an open-topped vessel having an openable lower door, the method may comprise the steps of positioning the door in the closed configuration at the filling location, receiving picked fruit or vegetables at the filling location, moving the end-effector to any of the plurality of container locations, and positioning the door in the open configuration to deliver the picked fruit or vegetables to the respective container location.

In embodiments in which the open-topped vessel of such an end-effector comprises a plurality of compartments, the method may comprise the steps of using the, or each, robotic picking arm to deliver picked fruit or vegetables of a first grade to a first compartment of the plurality of compartments, and to deliver picked fruit or vegetables of a second grade to a second compartment of the plurality of compartments. The method may further comprise: moving the end-effector to a first of the plurality of container locations and positioning the door of the first compartment in the open configuration to deliver the picked fruit or vegetables from the first compartment to the first container location; and moving the end-effector to a second of the plurality of container locations and positioning the door of the second compartment in the open configuration to deliver the picked fruit or vegetables from the second compartment to the second container location In embodiments comprising an end-effector with a gripper, the method may comprise the steps of moving the gripper to the gripping configuration at the filling location to grip a container of picked fruit or vegetables, moving the end-effector to any of the plurality of container locations, and moving the gripper to the release configuration to deliver the container to the respective container location.

In embodiments with an alternative filling location, the method may comprise the steps of using the, or each, robotic picking arm to deliver picked fruit or vegetables of a first grade to the filling location of the, or the respective, storage system and to deliver picked fruit or vegetables of a second grade different to the first grade to the alternative filling location of the, or the respective, storage system. Further, the method may comprise using the robotic handling mechanism of the, or the respective, storage system to move fruit or vegetables from the filling location to any one of a first subset of the plurality of container locations, and to move fruit or vegetables from the alternative filling location to any one of a second subset of the plurality of container locations.

In embodiments in which the one or picking arms comprise a local storage vessel, step (i) may comprise depositing each item of picked fruit or vegetable into the local storage vessel of the or each robotic picking am until the local storage vessel houses a plurality of picked items, and then delivering the plurality of picked items to the filling location of the, or the respective, storage system. This further reduces picking cycle times.

A fourth aspect of the invention provides a robotic picking arm, optionally for use in a system according to the first aspect, the picking arm comprising a picking end-effector configured to pick items of fruit or vegetables, and a local storage vessel configured to receive a plurality of fruit or vegetables picked by the picking end-effector. Such a picking arm provides improved picking cycle times over known picking arms since the amount of time spent travelling between the picking region (vine, tree, bush etc.) and the delivery point (e.g. filling location) is minimised.

The local storage vessel is preferably configured to move in tandem with the picking end-effector. Moreover, the local storage vessel preferably comprises an open-topped vessel arranged beneath the picking end-effector to receive picked items of fruit or vegetables released by the picking end-effector.

Any of the features described herein in relation to any embodiment or aspect of the invention may be applied to any aspect of the invention, either individually or in any combination.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
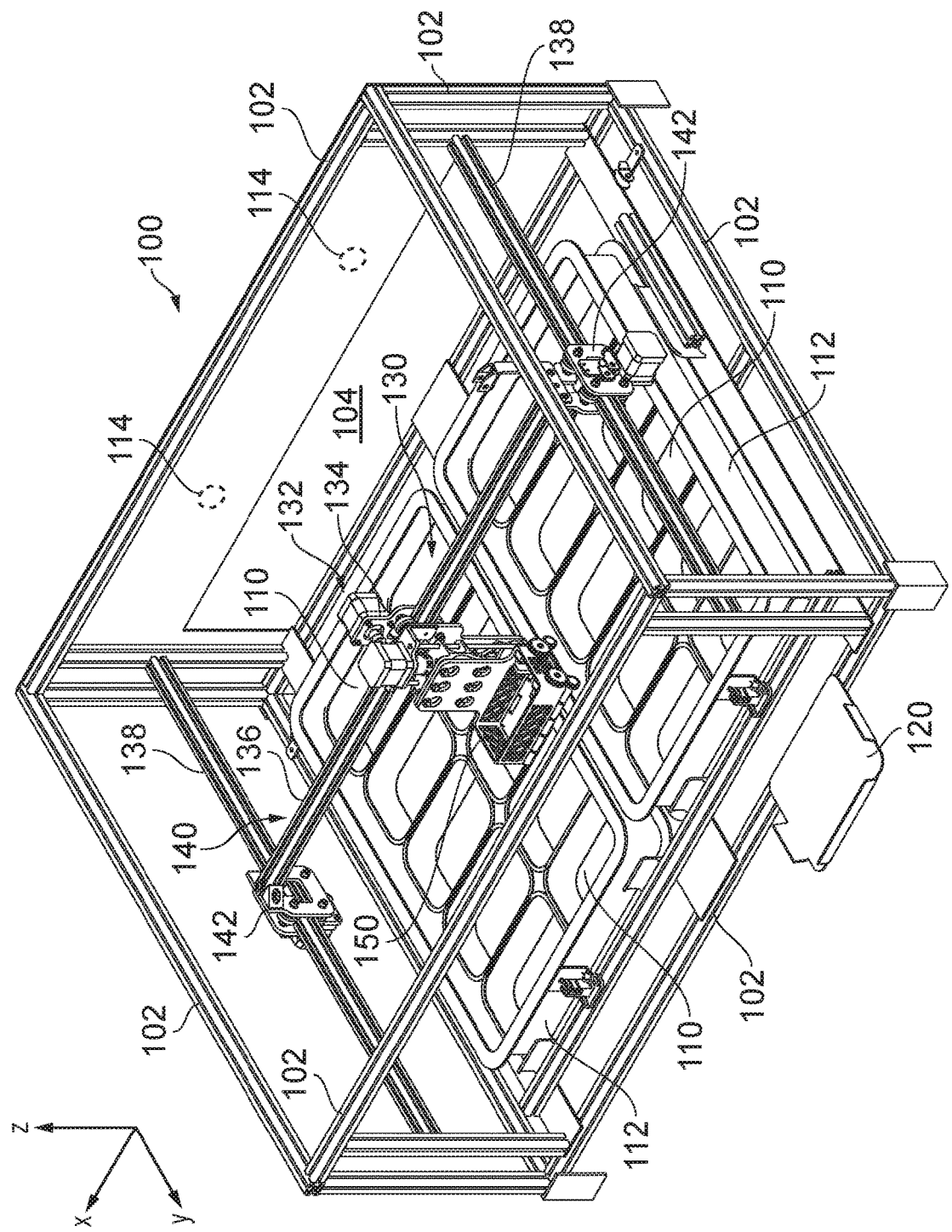
FIG. 1 is an isometric view of a storage system for a fruit or vegetable picking system according to an embodiment of the present invention.

The present invention provides a fruit or vegetable picking/harvesting system 300 comprising one or more robotic picking arms 200 that each deliver picked fruit or vegetables to a respective storage system 100.

The robotic picking arms 200 may comprise any suitable robotic arm having an end-effector configured for fruit or vegetable picking, and so the features of robotic picking arms are not discussed below. An appropriate configuration for such a robotic picking arm 200 is disclosed in WO2019/053474, which is hereby incorporated by reference.

The picking system 300 comprises a movable base 310. In the illustrated embodiments the base 310 comprises a generally rectangular platform 312, or chassis, that is propellable by four wheels 314. In some embodiments the wheels 314 may be adapted to travel along rails or other tracks in a floor of a location in which the picking system 300 is operated.

A plurality (four in the illustrated embodiments) of storage systems 100 are stacked on top of one another on the base 310, and a robotic picking arm 200 is mounted in a fixed position relative to each storage system 100. The robotic picking arms 200 are each mounted at respective vertical positions along a generally vertical mounting column 210 fixed to the base 310. The vertical spacing between each picking arm 200 corresponds to a vertical height of each storage system 100.

The robotic picking arms 200 are mounted at a mounting face of the picking system 300 that is generally transverse to a path of travel of the picking system 300. That is, the picking arms 200 are mounted between each pair of wheels 314 so that the arms 200 are located on the forwardly-facing face or rearwardly-facing face of the picking system 300, depending on the direction of travel of the picking system 300. In some embodiments the picking arms 200 are located at a mid-line of the mounting face, i.e. mid-way between each pair of wheels 314.

This arrangement permits the picking arms 200 to pick fruit or vegetables to either side of a track, aisle or other path along which the picking system 300 travels. A particular advantage is that it is not necessary to turn the picking system 300 around at the end of each track, aisle or path, a process that is both time-consuming in operation and likely to add complexity to the design of the system. Instead the picking system 300 can, for example, travel along the track, aisle or path in a first direction and pick fruit or vegetables to a first side of the picking system 300 (e.g. from a first crop row), then simply reverse direction to travel along the track, aisle or path in a second direction opposite to the first direction and pick fruit of vegetables to a second side of the picking system 300 opposite to the first side (e.g. from a second crop row).

Each storage system 100 has a superstructure 102 comprising a rigid framework or other rigid housing defining an interior volume within which picked fruit is stored in a plurality of (twenty in the illustrated embodiments) containers 110 (e.g. punnets). Each container 110 is positioned at a respective container location. The containers 110 and corresponding container locations are arranged in a generally horizontal array and are seated in one or more (two in the illustrated embodiments) trays 112 (also referred to as crates). The trays 112 can be removed via a tray opening 104 in a rear face of the storage system 100 when the containers 110 are full. LEDs 114 and electronically transmitted signals indicate to the operator whether the trays 112 are empty, full or require replacement.

The size, shape, configuration and/or number of containers 110 may be varied in use, depending on the nature of the fruit or vegetable to be picked. The size, shape, configuration and/or number of container locations varies accordingly, and in particular is varied to correspond with the footprint of the selected containers 110.

In some embodiments each container location comprises a mass sensor configured to measure a mass of a filled container 110 positioned at the respective container location.

In this way, a quality control check for the quantity of picked items can be carried out while the containers 110 are located within the storage system 110.

Each storage system 100 comprises a filling location 120 where picked fruit or vegetables are delivered by the respective robotic picking arm 200. In the illustrated embodiments the filling location 120 takes the form of a shelf on which a container 110 can be seated. In other embodiments the filling location 120 may comprise no shelf or corresponding structural features. This is discussed further below.

The picking arms 200 are located adjacent the filling locations 120 to minimise the distance travelled by each picking end-effector 220 between picking of an item of fruit or vegetable and delivery of that item to the storage system 100. In some embodiments the filling location 120 may comprise a mass sensor for measuring a mass of a container 110 located at the filling location 120.

Each storage system 100 comprises a robotic handling system 130 including a Cartesian coordinate robot 132 with three degrees of freedom, allowing movement of a handling end-effector 150 in x-, y- and z-directions. The robot 132 has a carriage 134 comprising an x-sliding joint 135 that moves in the x-direction along a x-rail 136 of an overhead gantry 140. The x-rail 136 is mounted at either end on two y-rails 138 via y-sliding joints 142. Each y-rail 138 is fixed at either end to the superstructure 102. Movement of the x-rail 136 along the y-rails 138 via the y-sliding joints 142 provides movement of the carriage 134 in the y-direction. The Cartesian coordinate robot 132 also comprises a connection feature 144 to which a handling end-effector 150 can be connected. The connection feature 144 is movable in a z-direction relative to the carriage 134 via a worm drive that provides a z-sliding joint 145. In this way, the end-effector 150 can move in each of the x-, y- and z-directions.

Figure 2:
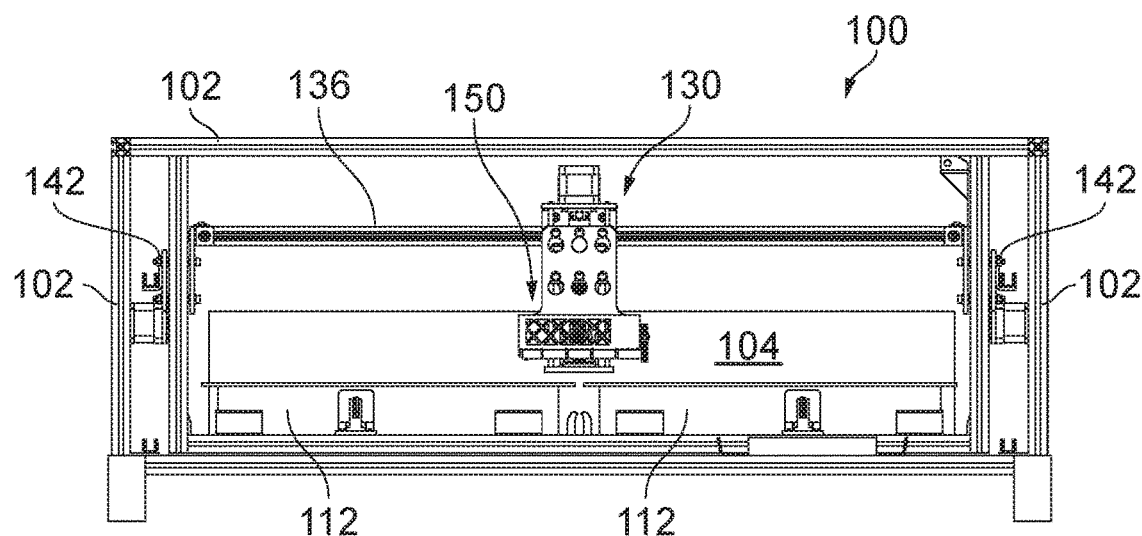
FIG. 2 is a front view of the storage system of FIG. 1.
Figure 3:
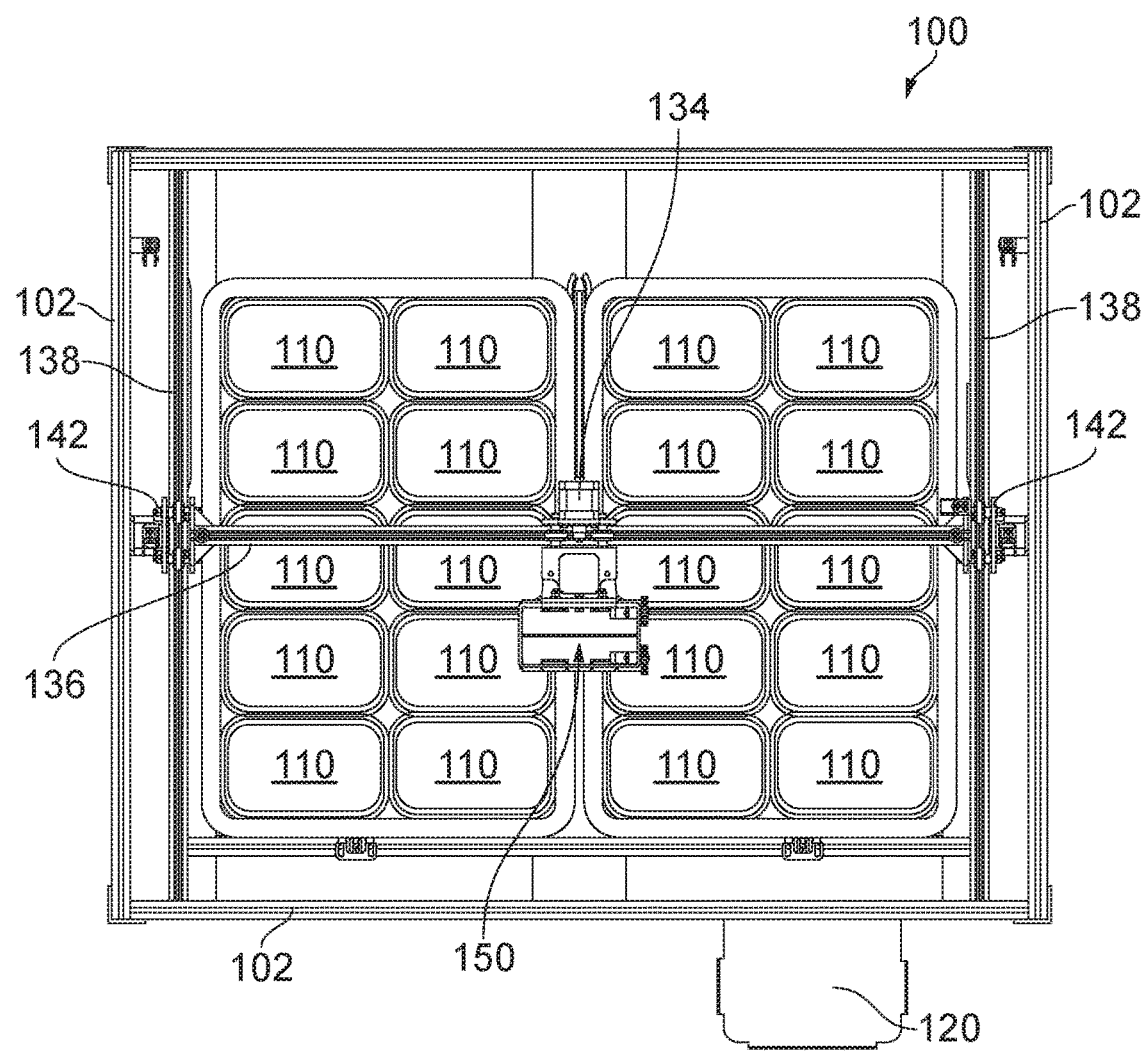
FIG. 3 is a top view of the storage system of FIG. 1.
Figure 4:
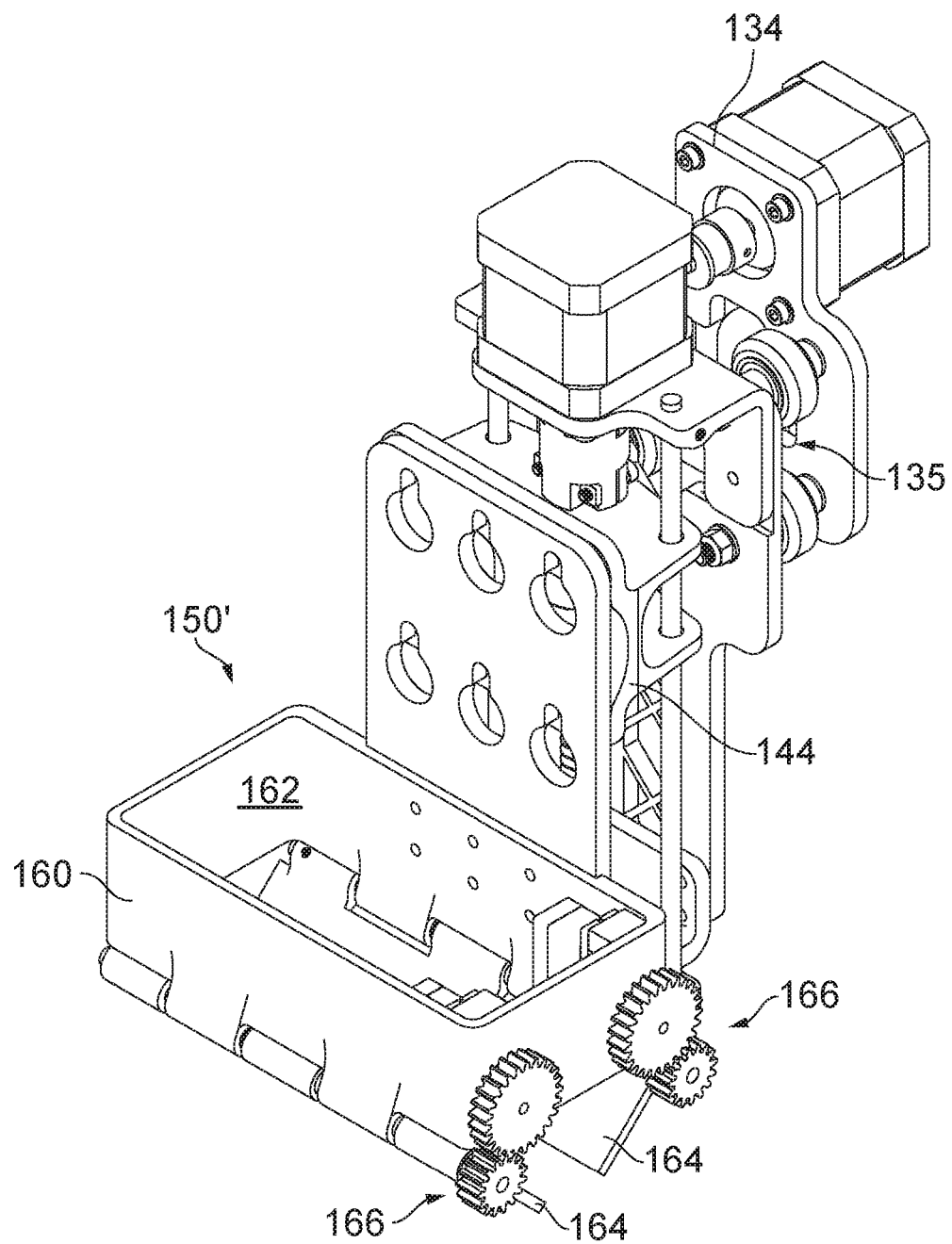
FIG. 4 is an isometric view of a first embodiment of an end-effector for use in storage systems according to embodiments of the invention.
Figure 5:
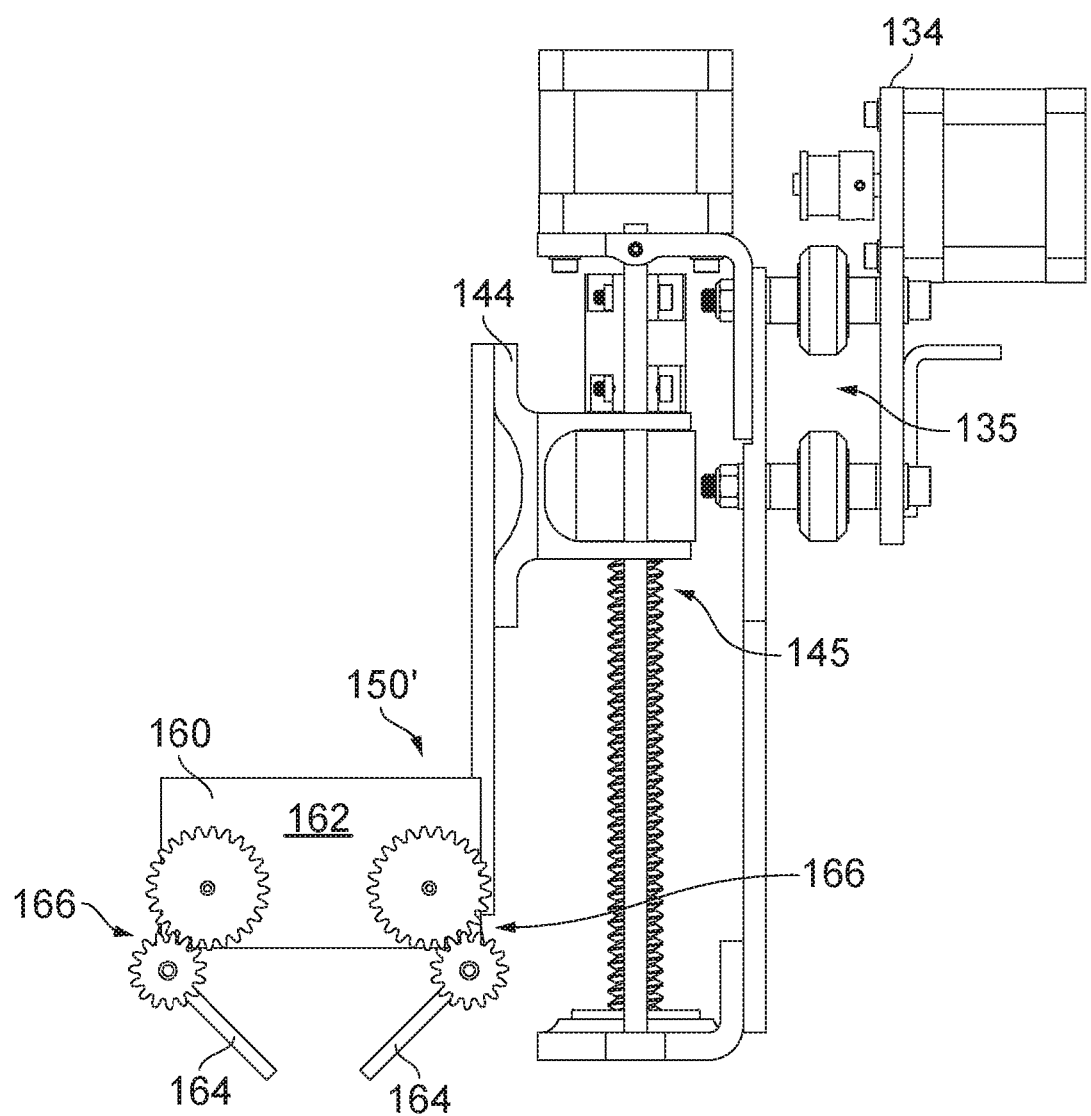
FIG. 5 is a side view of the end-effector of FIG. 4.
Figure 6:
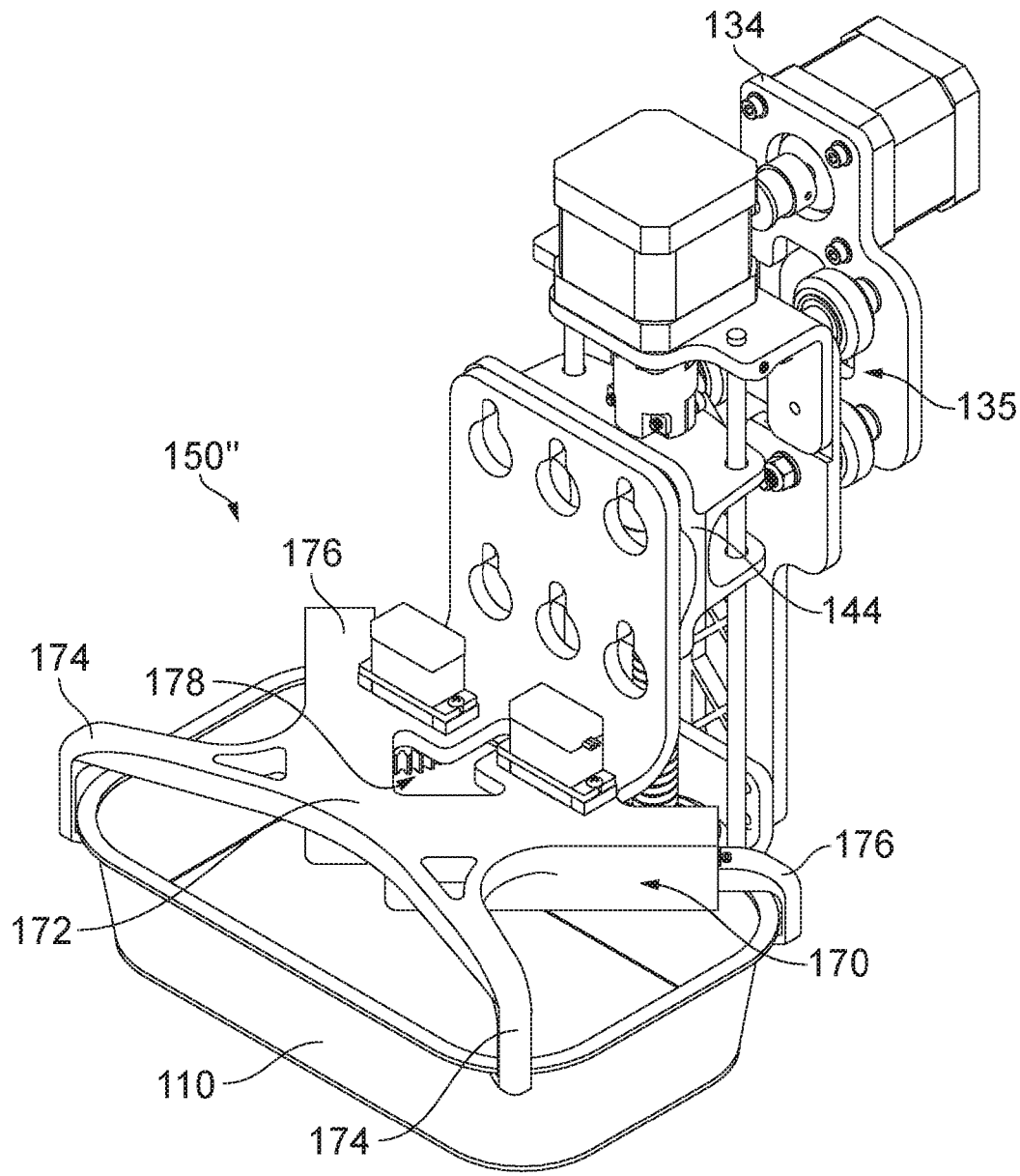
FIG. 6 is an isometric view of a second embodiment of an end-effector for use in storage systems according to embodiments of the invention.
Figure 7:
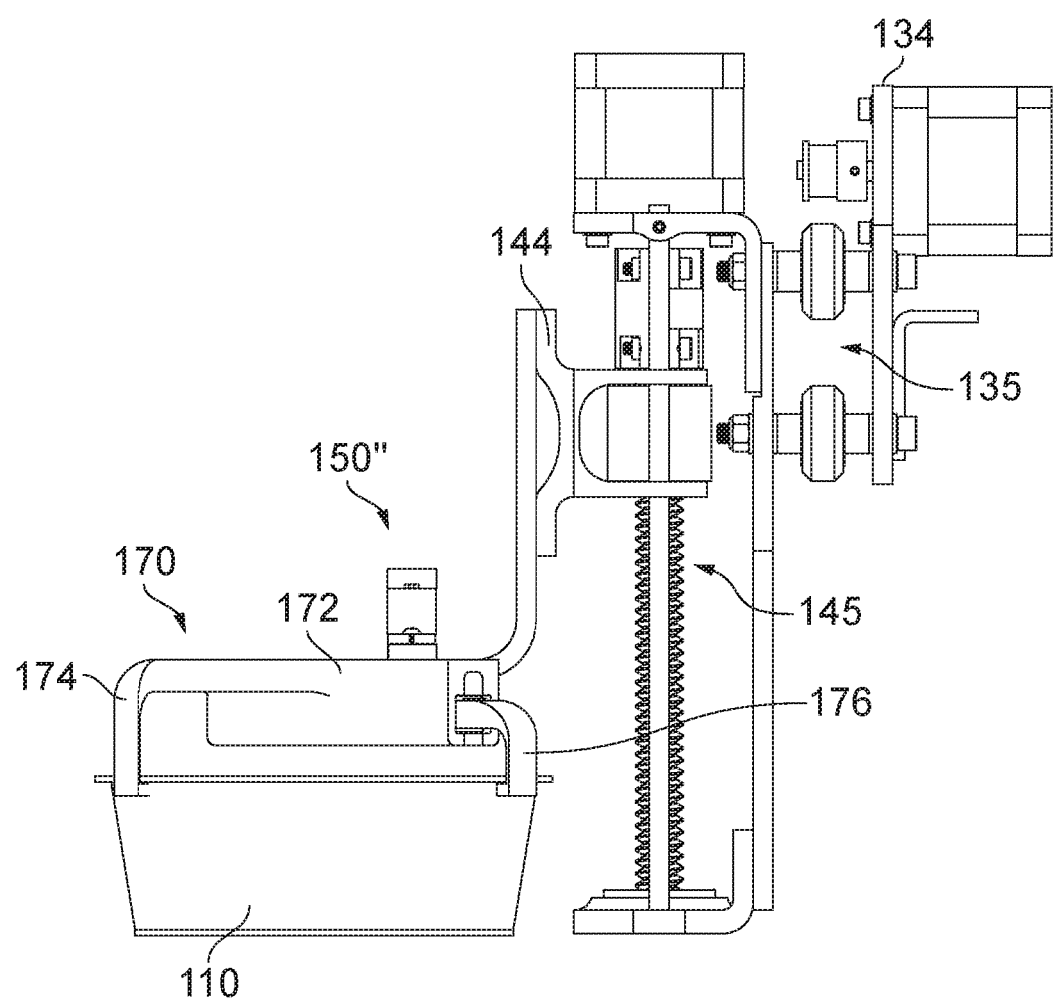
FIG. 7 is a side view of the end-effector of FIG. 6.
Figure 8:
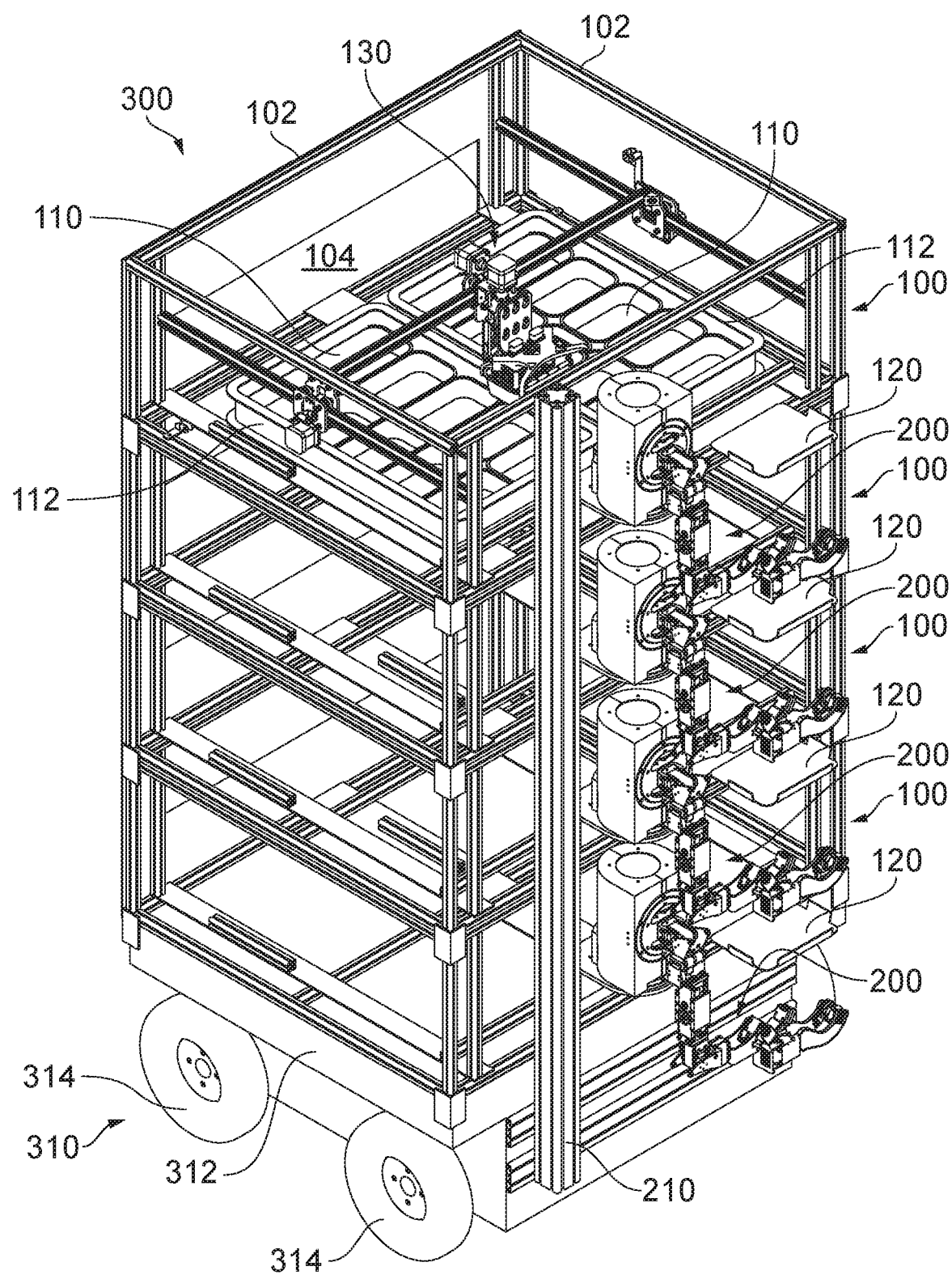
FIG. 8 is an isometric view of a fruit or vegetable picking system according to an embodiment of the present invention in which the robotic handling system and other features of the four storage systems are illustrated only in the uppermost storage system 100 only, though such features are in fact present in each storage system 100.
Figure 9:
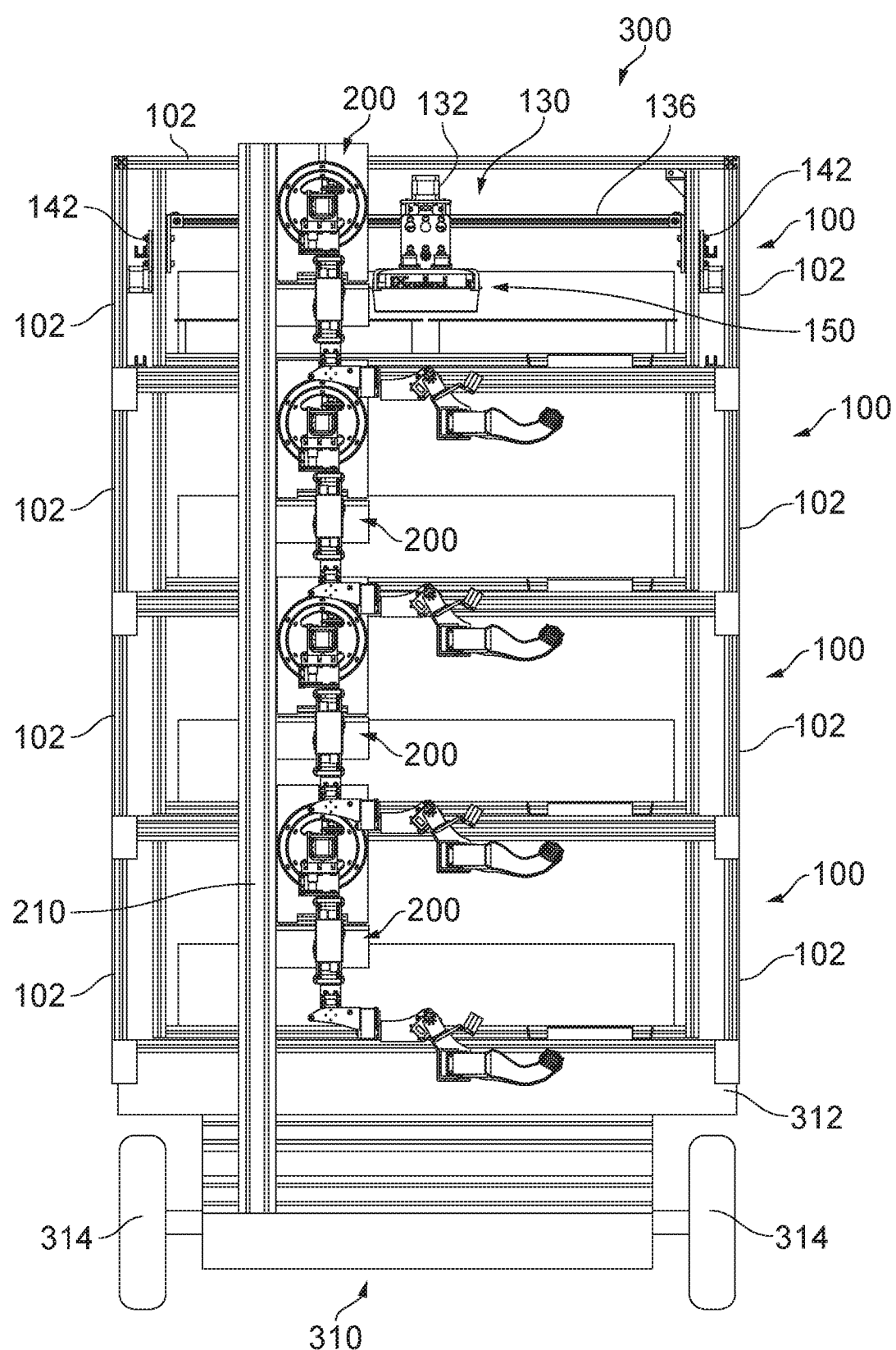
FIG. 9 is a back view of the fruit or vegetable picking system of FIG. 8.
Figure 10:
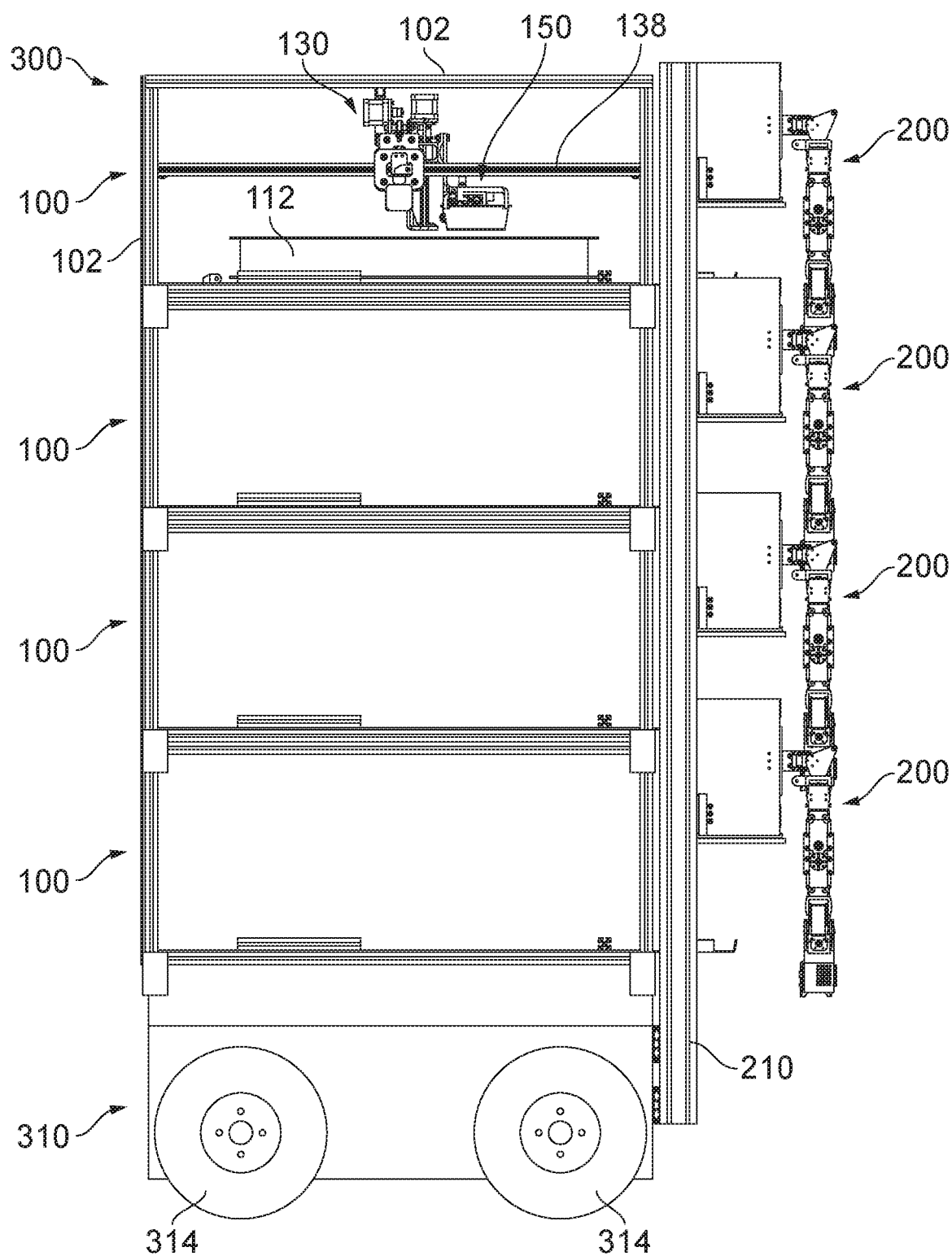
FIG. 10 is a side view of the fruit or vegetable picking system of FIG. 8.
Figure 11:
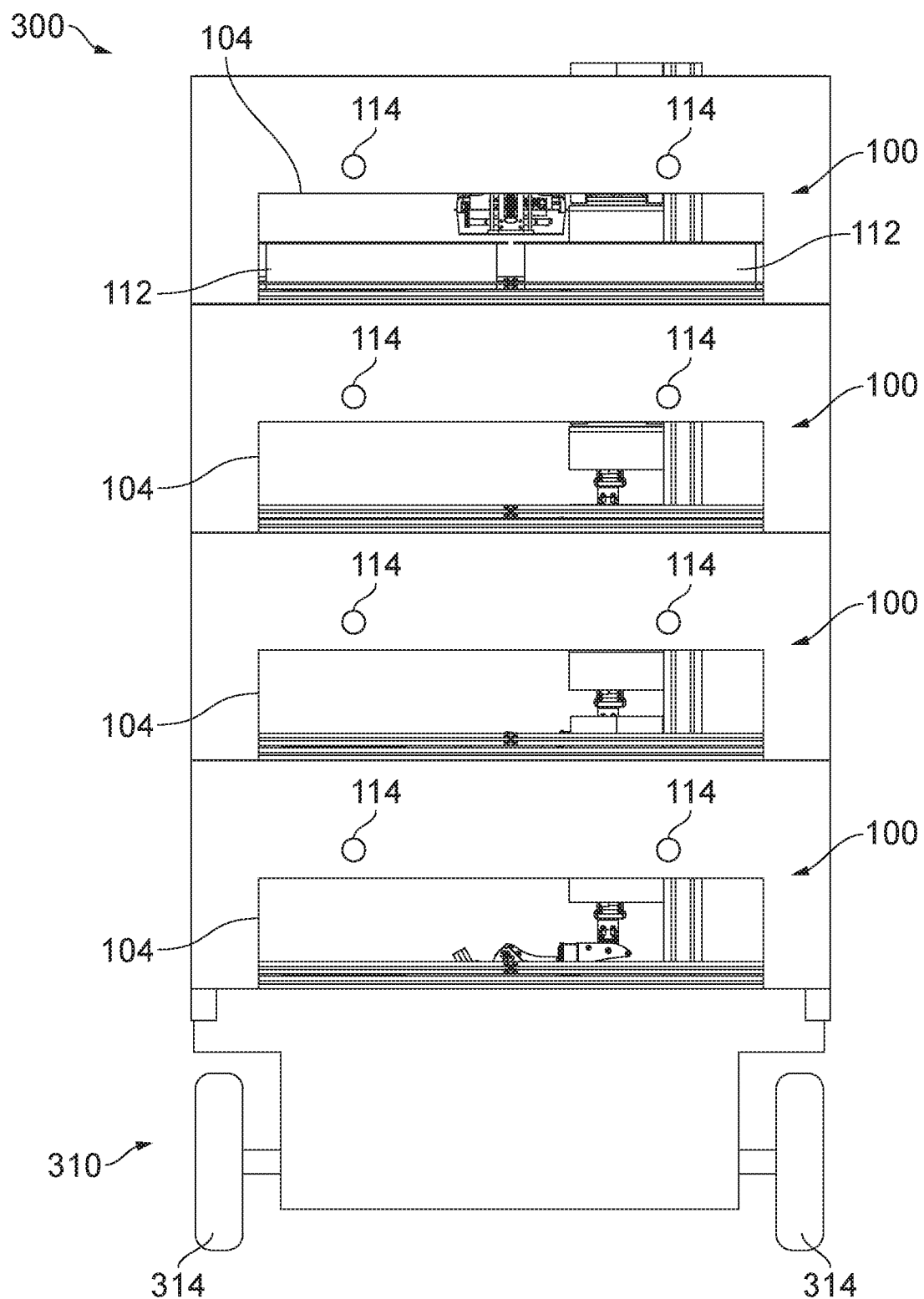
FIG. 11 is a front view of the fruit or vegetable picking system of FIG. 8.

First 150' and second 150" embodiments of the end-effector 150 are illustrated in FIGS. 4-5 and 6-7, respectively. The first embodiment 150' of FIGS. 4 and 5 is shown in the illustrations of the storage system 100 in FIGS. 1 to 3, while the second embodiment 150" of FIGS. 6 and 7 is shown in the illustrations of the picking system 300 in FIGS. 8 to 11. For the avoidance of doubt, either end-effector embodiment, or a different end-effector entirely, may be employed in embodiments of the storage system 100 and picking system 300.

The first embodiment of the end-effector 150' comprises an open-topped vessel 160 that defines a temporary storage volume 162 for picked fruit or vegetables. In the present embodiment the temporary storage volume 162 corresponds generally to a volume of one of the containers 110 (punnets) in the storage system 100. To determine when the appropriate volume of picked fruits or vegetables has been placed in the vessel 160 the number of picked items may be counted, or alternatively the end-effector 150' may comprise one or more sensors to measure filled volume and/or mass.

The vessel 160 is open at its upper face and has a pair of hinged doors 164 at its lower face. The doors 164 are moved between open and closed configurations by an opening mechanism controlled by the Cartesian coordinate robot 132. The opening mechanism in the illustrated embodiment comprises two pairs of meshed gears 166, one pair for each door 164. A first gear from each pair 166 is mounted on the vessel 160 and a second gear is mounted on the respective door 164 at the hinge line. In this way, rotation of the first gear causes pivoting of the door 164 between open and closed configurations. In use, the vessel 160 extends through an opening (not shown) that connects the interior volume of the superstructure 102 with the filling location 120, to thereby position the vessel 160 at the filling station. The carriage 134 and other parts of the Cartesian coordinate robot 132 remain within the interior volume.

The second embodiment of the end-effector 150" comprises a gripper 170 configured to grip an upper portion, or rim, of a filled container 110 to thereby move the container 110 from the filling location 120 to one of the container locations in the storage system 100. Sensors may be incorporated into the filling location 120 to determine when the filled container is sufficiently filled. For example, the filling location 120 may comprise one or more sensors to measure filled volume and/or mass. Alternatively, the number of items added to the container 110 may be counted and the volume estimated by reference to an approximate/average volume of each item.

The gripper 170 generally comprises an overhead member 172 that extends above the open upper face of a container 110 in use. Four fingers extend from the overhead member 172 to grip the container. Two of the fingers are generally rigid fingers 174 that have a downwardly-pointing tip portion configured to engage a first side of a container 110. The remaining two fingers are actuatable fingers 176 having an actuatable portion that can slide relative to the overhead member 172 via a gear rack 178 controlled by the Cartesian coordinate robot 132. The actuatable portions each have a downwardly-pointing tip portion that can engage a second side of a container 110 opposed to the first side. Movement of the actuatable portions of the actuatable fingers 176 causes the gripper 170 to move between a gripping configuration in which the actuatable fingers 176 and rigid fingers 174 between them grip the container 110 and a release configuration in which the container is released.

Like the first embodiment, in use the gripper 170 extends through an opening (not shown) that connects the interior volume of the superstructure 102 with the filling location 120, to thereby position the gripper 170 at the filling station. The carriage 134 and other parts of the Cartesian coordinate robot 132 remain within the interior volume.

Figure 12:
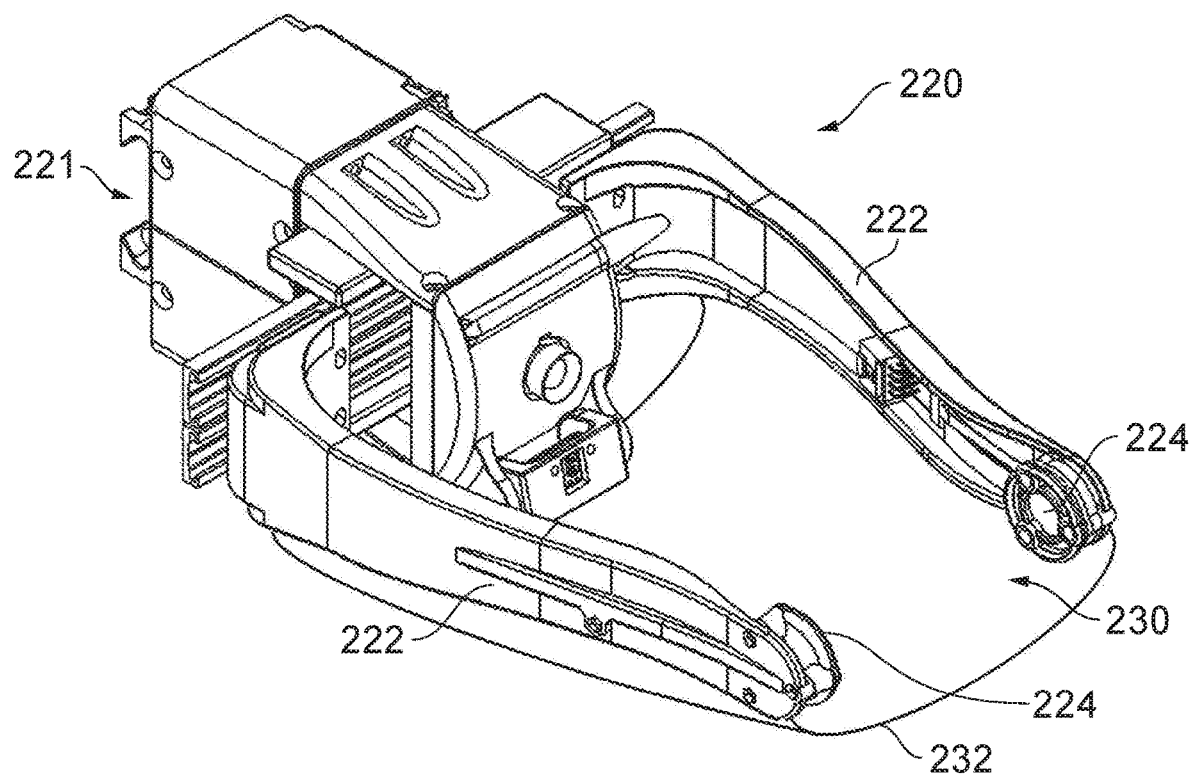
FIG. 12 is an isometric view of a picking end-effector and local storage vessel according to an embodiment of the invention.
Figure 13:
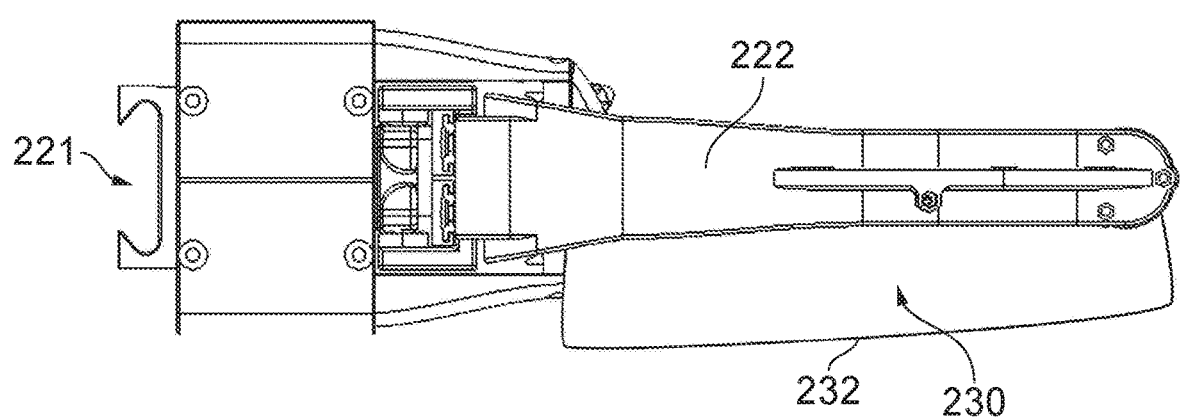
FIG. 13 is a side view of the picking end-effector and local storage vessel of FIG. 12.

FIGS. 12 and 13 illustrate an embodiment of a picking end-effector 220 suitable for use in robotic picking arms 200 according to embodiments of the invention. The picking end-effector 220 connects to a link of the robotic picking arm 200 via coupling member 221 which provides a rigid connection via a sliding interface. The picking end-effector 220 comprises a pair of opposing rigid finger members 222 with a pliable pad 224 at a free end thereof. The finger members 222 move in a pincer configuration to grip an item of fruit or vegetable (not shown) between the pliable pads 224.

The picking end-effector 220 also comprises a local storage vessel 230, which in the illustrated embodiment is in the form of a sling 232 formed from a flexible membrane that extends between the finger members 222. The local storage vessel 230 defines an open-topped local storage volume in which items of fruit or vegetables picked by the finger members 222 can be temporarily stored. Once a given quantity of fruit or vegetables (e.g. ten items) has been stored in the local storage volume the picking end-effector then delivers the stored picked items to the filling location 120. Alternatively, or in addition, the picking end-effector 220 may comprise a mass sensor configured to measure the mass of the picked items located in the local storage volume, and the stored picked items may be transferred to the filling location 120 when a given mass has been accumulated. This arrangement reduces the number of cycles, or movements, the picking arm 200 is required to make between the picking region (i.e. the vine, tree, bush, etc.) and the filling location 120, and therefore reduces the overall picking cycle time.

In the illustrated embodiment the local storage vessel 230 extends directly underneath the pliable pads 224 so that picked items are automatically captured within the local storage volume simply by separating the pliable pads so that the picked item is released. In other embodiments the local storage vessel 230 may be located elsewhere relative to the finger members 222 and/or pliable pads 224. For example, the local storage vessel 230 may be located elsewhere on the picking end-effector 220 so that it moves in tandem with the end-effector 220 but is not directly beneath the pliable pads 224, i.e. not in a location where it must enter the vine, tree, bush etc. Alternatively, the local storage vessel 230 may be located elsewhere on the robotic picking arm 200 so that it is close to the picking end-effector 220.

In use, the picking system 300 is moved into its desired location by rotating wheels 314 of the base 310, optionally along tracks or rails as described above. The robotic picking arms 200 each pick items of fruit or vegetables and deliver them to the filling location 120 of their respective storage system 110. In embodiments in which the robotic picking arms 200 each comprise a local storage vessel 230, the picking arms 200 deliver a plurality of items of fruit or vegetables to the filling location 120 at each deposit.

In embodiments comprising the first embodiment 150' of the handling end-effector the handling end-effector 150' is first positioned so that the vessel 160 is located in the filling location 120. The picked items are deposited in the vessel 160 until the vessel contains the desired amount of fruit or vegetables. The desired quantity of fruit or vegetables may be determined, for example, by measurement of a mass of the contents of the vessel 160 by a mass sensor located in the handling end-effector 150'.

In embodiments comprising the second embodiment 150" of the handling end-effector the items are deposited directly in a container (punnet) 110 located at the filling location 120. When the container 100 contains the desired amount of fruit or vegetables (as determined, for example, by measurement of a mass of the filled container 110 by a mass sensor located at the filling location 120) the handling end-effector 150" positions itself so that the gripper 170 is above the filled container 110 and moves to the gripping configuration to thereby grip the container 110.

Next, the handling end-effector 150', 150" is moved, by the Cartesian coordinate robot 132, to a pre-determined one of the plurality of container locations within the storage system 100.

In embodiments comprising the first embodiment 150' of the handling end-effector the doors 164 are then opened to the open configuration to transfer the fruit or vegetables from the vessel 160 into the container 110 below.

In embodiments comprising the second embodiment 150" of the handling end-effector the gripper 170 is then moved to the release configuration to place the filled container 110 at the selected container location.

In embodiments in which each container location comprises a mass sensor, such mass sensors are used to measure a mass of each filled container 110 positioned at each respective container location.

The time required to transfer the picked fruit or vegetables into the storage system 100 in this way is typically less than the time required for the picking arms to complete a picking operation of picking one or more items of fruit or vegetable. For example, a picking operation may comprise picking one item and delivering it directly to the filling location, or picking a plurality of items and temporarily storing them in the local storage vessel prior to delivery to the filling location. In this way, picking time is not sacrificed. Moreover, by requiring the robotic picking arms to only deliver picked items to a fixed location that is nearby, the time taken for each picking step is minimised.

During picking of the fruit or vegetables the picking system 300 may be moved along a set track, aisle or other path as necessary to access ripe fruit or vegetables. In some embodiments the picking system 300 is first moved in a first direction along the track, aisle or other path, and fruit or vegetables to a first side of the picking system 300 (for example from a first crop row) are picked. When the picking system 300 reaches an end point, or other appropriate location, along the track, aisle or path its direction is reversed so that it is now travelling in a second direction opposite to the first direction and the picking arms pick fruit or vegetables to a second side of the picking system 300 opposite to the first side (for example from a second crop row aligned with the first crop row).

This arrangement provides a particularly efficient means of picking fruit or vegetables along a set track, aisle or other path between rows of fruit- or vegetable-bearing plants.

Many alternative embodiments are envisaged by the inventors, and encompassed by the present application. For example, each storage system 100 may be served by two or more picking arms 200. Each picking arm 200 may deliver picked items to a single filling location 120, or in other embodiments each storage system 100 may have two or more filling locations 120 and each picking arm 200 may deliver picked items to a respective one of the filling locations. In some embodiments each picking arm 200 may deliver picked items to two or more adjacent filling locations.

The invention may be employed in situations where two or more different grades of fruit or vegetable are being picked. For example, the different grades may be different sizes, different degrees of ripeness etc. Each storage system 100 may have two or more filling locations 120, a first filling location being for items of a first grade and a second filling location being for items of a second grade. The robotic handling system 130 may be configured to move items delivered to the first filling location to a first tray 112 and items delivered to the second filling location to a second tray 112. In an alternative example, the vessel 160 of the first embodiment of the handling end-effector 150' may comprise a plurality of compartments, each having a respective pair of hinged doors 164 (or single hinged door). In this way, picked items of a respective grade can be delivered to a respective one of the compartments, in order that the picked items can be graded during the picking operation.

The invention claimed is:
1. Fruit or vegetable picking system comprising:
a moveable base;
one or more robotic picking arms mounted on the base, the one or more picking arms each having a picking end-effector configured to pick a fruit or vegetable; and
one or more storage systems mounted on the base, the one or more storage systems having: a filling location configured to receive picked fruit or vegetables; a storage region having a plurality of container locations, each container location being configured to house a fruit or vegetable container; and one or more robotic handling mechanisms configured to move fruit or vegetables from the filling location to any of the plurality of container locations, wherein the one or more robotic picking arms are controllable to deliver picked fruit or vegetables to the filling location, wherein each of the one or more robotic picking arms comprises a local storage vessel configured to receive a plurality of fruit or vegetables picked by the picking end-effector, and each of the one or more robotic picking arms is controllable to deliver picked fruit or vegetables from the local storage vessel to the respective filling location.

2. A fruit or vegetable picking system according to claim 1, comprising:
a plurality of robotic picking arms mounted on the base, each picking arm having a picking end-effector configured to pick a fruit or vegetable; and
a plurality of storage systems mounted on the base, each storage system having: a filling location; a storage region having a plurality of container locations, each container location being configured to house a fruit or vegetable container; and a robotic handling mechanism configured to move fruit or vegetables from the filling location to any of the plurality of container locations,
wherein each robotic picking arm is controllable to deliver picked fruit or vegetables to the filling location of a respective one of the plurality of storage systems.

3. A fruit or vegetable picking system according to claim 2, wherein the plurality of storage systems are stacked one on top of each other on the movable base.

4. A fruit or vegetable picking system according to claim 1, wherein the one or more, or each, storage system comprises a self-contained unit containing the filling location, storage region and robotic handling mechanism.

5. A fruit or vegetable picking system according to claim 1, wherein the plurality of container locations in the storage region of the, or each, robotic handling mechanism are arranged in a generally horizontal array.

6. A fruit or vegetable picking system according to claim 1, wherein the local storage vessel is configured to move in tandem with the picking end-effector of the respective robotic picking arm.

7. A fruit or vegetable picking system according to claim 1, wherein the local storage vessel comprises an open-topped vessel arranged beneath the picking end-effector to receive picked items of fruit or vegetables released by the picking end-effector.

8. A fruit or vegetable picking system according to claim 1, wherein the storage region of the one or more, or each, storage system is enclosed within an interior volume of a superstructure of the storage system, and the filling location of the one or more, or each, storage system is outside of the interior volume.

9. A fruit or vegetable picking system according to claim 8, wherein the, or each, robotic handling mechanism is located within the interior volume.

10. A fruit or vegetable picking system comprising:
a moveable base;
one or more robotic picking arms mounted on the base, the one or more picking arms each having a picking end-effector configured to pick a fruit or vegetable; and
one or more storage sys s baying: a filling location configured to receive picked fruit or vegetables, a storage regio n having a plurality of container locations, each container location being configured to house a fruit or vegetable container; and one or more robotic handling mechanisms configured to move fruit or vegetables from the filling location to any of the plurality of container locations, wherein the one or more robotic picking arms are controllable to deliver picked fruit or vegetables to the filling location, wherein the, or each, robotic handling mechanism comprises a handling end-effector configured to move linearly along any of the three axes of a Cartesian coordinate system.

11. A fruit or vegetable picking system according to claim 10, wherein the, or each, robotic handling mechanism comprises a movable carriage, the handling end-effector being mounted on the movable carriage.

12. A fruit or vegetable picking system according to claim 11, wherein the movable carriage is mounted on an overhead gantry.

13. A fruit or vegetable picking system according to claim 11, wherein the handling end-effector is movable linearly relative to the movable carriage.

14. A method of picking fruit or vegetables using a fruit or vegetable picking system comprising:
a moveable base;
one or more robotic picking arms mounted on the base, the one or more picking arms each having a picking end-effector configured to pick a fruit or vegetable; and
one or more storage systems mounted on the base, the one or more storage systems having: a filling location configured to receive picked fruit or vegetables; a storage region having a plurality of container locations, each container location being configured to house a fruit or vegetable container; and one or more robotic handling mechanisms configured to move fruit or vegetables from the filling location to any of the plurality of container locations,
wherein the one or more robotic picking arms are controllable to deliver picked fruit or vegetables to the filling location, the method comprising repeating the steps of:
(i) picking one or more fruit or vegetables with the, or each, picking arm and delivering the picked fruit or vegetables to the filling location of the, or the respective, storage system; and
(ii) using the robotic handling mechanism of the, or the respective, storage system to move the picked fruit or vegetables from the filling location to a respective one of the plurality of container locations,
the method further comprising the step of repairing the fruit or vegetable picking system by removing a faulty storage system and replacing it with a functional storage system.

15. A method according to claim 14, comprising the further step of moving the base after step (i) and before step (ii).

16. A method according to claim 14, wherein step (i) comprises using the one or more robotic picking arms to pick fruit or vegetables from a first crop row by moving the movable base of the picking system in a first direction along a linear movement path between the first crop row and a second crop row, and the method further includes:
(iii) using the one or more robotic picking arms to pick fruit or vegetables from the second crop row by moving the movable base of the picking system in a second direction, opposite to the first direction, along the linear movement path without turning the fruit or vegetable picking system relative to the linear movement path.

17. A method according to claim 14, comprising the step of stacking a further storage system on top of the storage system.

\* \* \* \* \*